United States Patent [19]

Schildkraut et al.

[11] Patent Number: 5,157,541

[45] Date of Patent: * Oct. 20, 1992

[54] OPTICAL ARTICLE FOR REFLECTION MODULATION

[75] Inventors: Jay S. Schildkraut, Rochester, N.Y.; Christopher B. Rider, Mitcham, United Kingdom; Michael Scozzafava, Rochester, N.Y.

[73] Assignee: Eastman Kodak Company, Rochester, N.Y.

[*] Notice: The portion of the term of this patent subsequent to Nov. 20, 2007 has been disclaimed.

[21] Appl. No.: 583,638

[22] Filed: Sep. 17, 1990

[30] Foreign Application Priority Data

May 31, 1990 [GB] United Kingdom ............... 9012162

[51] Int. Cl.⁵ .......................... G02F 1/01; G02B 6/00
[52] U.S. Cl. .................................. 359/276; 359/245; 359/321; 385/141; 385/4
[58] Field of Search ............... 350/355, 356, 96.34, 350/374, 96.13; 252/583; 359/245, 276, 321, 141; 385/141

[56] References Cited

U.S. PATENT DOCUMENTS

| | | | |
|---|---|---|---|
| 4,249,796 | 2/1981 | Sincerbox et al. | 350/370 |
| 4,451,123 | 5/1984 | McNeill et al. | 350/386 |
| 4,792,208 | 12/1988 | Ulman et al. | 350/96.34 |
| 4,796,971 | 1/1989 | Robello et al. | 350/96.34 |
| 4,886,339 | 12/1989 | Scozzafava et al. | 350/96.34 |
| 4,900,127 | 2/1990 | Robello et al. | 350/356 |
| 4,917,455 | 4/1990 | Scane | 350/96.34 |
| 4,946,235 | 8/1990 | Scozzafava et al. | 350/96.34 |
| 4,948,225 | 8/1990 | Rider et al. | 350/96.34 |
| 4,952,640 | 8/1990 | Francis et al. | 525/328.2 |
| 4,955,977 | 9/1990 | Dao et al. | 350/96.34 |
| 4,971,426 | 11/1990 | Schildkraut et al. | 350/385 |
| 4,999,809 | 3/1991 | Schildkraut et al. | 365/106 |
| 5,008,043 | 4/1991 | Robello et al. | 252/582 |

OTHER PUBLICATIONS

Sarid, "Long-Range Plasmon Waves on Very Thin Metal Films", Phys. Rev. Lett., vol. 47, No. 26, pp. 1927-1930 (1981).
Yang et al., "Long-Range Surface Modes of Metal--Clad Four-Layer Waveguides", Applied Optics, vol. 25, No. 21, pp. 3903-3908 (1986).
Plumereau et al., "Electrooptic Light Modulator Using Long-Range Surface Plasmons", SPIE, vol. 800, Novel Optoelectronic Devices, pp. 79-83 (1987).
Persegol et al., "A Novel Type of Light Modulator", SPIE vol. 864, Advanced Optoelectronic Technology, pp. 42-44 (1987).
Schildkraut, "Long Range Surface Plasmon Electrooptic Modulator", Applied Physics, vol. 27, No. 21, Nov. 1, 1988, pp. 4587-4590.
Yeatman et al., "Surface Plasmon Spatial Light Modulators", SPIE, vol. 1151, Optical Information Processing Systems and Architecture, pp. 522-532 (1989).

*Primary Examiner*—Eugene R. Laroche
*Assistant Examiner*—Michael B. Shingleton
*Attorney, Agent, or Firm*—Carl O. Thomas

[57] ABSTRACT

An optical article capable of modulating the reflection of polarized monochromatic electromagnetic radiation is disclosed comprised of a reflective metal layer, means acting as a support for directing the electromagnetic radiation to the reflective metal layer, an electrooptic medium that exhibits a refractive index which is a function of an applied electrical potential, and a counter electrode. At least one of the reflective metal layer and the counter electrode taking the form of laterally spaced segments. The reflective metal layer has a thickness of less than 0.5 μm, and a dielectric layer having a thickness in the range of from 0.1 to 10 times the wavelength of the electromagnetic radiation and comprised of at least one metal oxide, metal fluoride, or low molecular weight aromatic compound is coated on the support. The electrooptic medium is a polymeric layer coated on the reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety. The polymeric layer exhibits a refractive index which differs from that of the dielectric layer by less than 20 percent in the absence of an applied electrical potential.

22 Claims, 2 Drawing Sheets

OPTICAL ARTICLE FOR REFLECTION MODULATION

FIELD OF THE INVENTION

The invention relates to optical articles for the reflective modulation of polarized monochromatic electromagnetic radiation.

BACKGROUND OF THE INVENTION

In the last decade physicists have observed that when polarized electromagnetic radiation of a selected wavelength is coupled to the surface of a thin metal layer forming an interface with a dielectric medium a portion of the electromagnetic radiation is reflected while an evanescent portion of the electromagnetic radiation (referred to as a surface plasma wave or surface plasmon or by the acronym SP) is propagated along the interface of the metal and dielectric medium.

In some instances an electrooptic dielectric medium has been employed. With a properly selected angle of incidence it is possible by electrically varying the refractive index of the electrooptic medium to vary the proportion of incident electromagnetic radiation that is reflected or internally propagated as surface plasmons. When the metal layer is positioned between the electrooptic medium and a dielectric layer, the thicknesses of the dielectric and metal layers are selected as a function of the wavelength of the electromagnetic radiation, and the indices of refraction of the dielectric layer and electrooptic medium match at least approximately, it is possible to increase the internal propagation sensitivity of the device to differences in electrical biasing of the electrooptic medium efficiency by coupling the evanescent portion of the incident electromagnetic radiation at the two interfaces of the metal layer into an antisymmetric mode, referred to as a long range surface plasmon (LRSP). When efficient long range surface plasmon coupling is achieved, possible within only a narrow range of electrical biasing, a very low proportion of incident electromagnetic radiation is reflected. A long range surface plasmon device can be modulated similarly to a surface plasmon device, but with higher variations in reflected electromagnetic radiation being realizable for a given variance in applied voltage.

Despite a consensus on the physics of operation, actual surface plasmon devices and, particularly, long range surface plasmon devices, which place even more stringent requirements device construction, have been disclosed in forms that demonstrate theoretical feasibility, but fall well short of being practically attractive to construct and use.

Sincerbox et al. U.S. Pat. No. 4,249,796, issued Feb. 10, 1981, is illustrative. Sincerbox's best mode of constructing a surface plasmon modulator is to optically couple a LaSF$_5$ prism (refractive index, n=1.88) to a sapphire plate (n=1.77) through an index matching liquid. A silver layer having a thickness of 300 to 500 Å serves as the reflective metal layer. An aqueous solution of 0.3 M KBr and 0.0113 M heptylviologen bromide completes a conductive bridge to a counter electrode. Notice that the sapphire plate serves as the support for the silver layer and that two separate liquid couplings are required to complete the device. It should be further noted that Sincerbox contains no suggestion of a long range surface plasmon modulator.

Sarid, "Long-Range Plasmon Waves on Very Thin Metal Films", Phys. Rev. Lett., Vol. 47, No. 26, pp. 1927–1930 (1981), describes long range surface plasmon propagation in a theoretical manner, but offers no suggestion as to how such a device could be constructed.

McNeill et al. U.S. Pat. No. 4,451,123, issued May 29, 1984, discloses a device similar to that of Sincerbox et al., but differing in the variable refractive index medium employed. For this purpose McNeill et al. employs a doped semiconductor capable of forming a rectifying junction with the metal film. The device operates in a bistable switching mode. In the absence of an applied electrical bias across the the semiconductor the device is "on", meaning that incident collimated electromagnetic radiation striking the base of the prism is reflected. When an electrical bias is applied, the refractive index of the semiconductor adjacent its interface with the metal film is altered, resulting in surface plasmon generation at the interface, which reduces reflected radiation and turns the device "off". The surface plasmon device is either "on" or "off", has no image forming capability, and does not lend itself to conversion to a long range surface plasmon device.

Yang et al., "Long-Range Surface Modes of Metal-Clad Four-Layer Waveguides", Applied Optics, Vol. 25, No. 21, pp. 3903–3908 (1986), is cumulative with Sarid in its theoretical discussion of long range surface plasmons, but goes somewhat further in reporting an actual device construction. A silver film of from 100 to 250Å in thickness was evaporated on a "Ag$^+$ exchanged glass waveguide" not otherwise identified. A prism made of ZF7 glass ($n_p$=1.7997) was coupled to the silver layer through an index matching liquid composed of naphthalene bromide and coal oil. Modulation was achieved by squeezing the device to change the thickness of the liquid layer.

Plumereau et al., "Electrooptic Light Modulator Using Long-Range Surface Plasmons", SPIE, Vol. 800, Novel Optoelectronic Devices, pp. 79–83 (1987), is cumulative with Sarid and Yang et al. in its theoretical discussion of long range surface plasmons, but provides in FIG. 1 a sketch of a constructed device consisting of a TiO$_2$ prism (1), an Ag layer (2), a CuCl layer (3), an Ag layer (4) and a CuCl layer (5). Modulation is achieved by applying a voltage between (2) and (4). Few clues as to actual device construction are provided beyond the indication that the electrooptic CuCl layer was monocrystalline with a {111} crystallographic orientation. It was suggested that zinc oxide could be used in place of CuCl as an electrooptic material. A very narrow angular range of $<10^{-2}$ degrees produced the resonance required for long range surface plasmon generation.

Persegol et al., "A Novel Type of Light Modulator", SPIE Vol. 864, Advanced Optoelectronic Technology, pp. 42–44 (1987), discloses in FIG. 1 a silicon support having a 2000 Å silica layer which is in turn coated with a 6930 Å zinc oxide layer, coated with a 95 Å gold layer. The device is completed by mounting a prism spaced from the gold layer by an air gap. Modulation is achieved by placing an electrical bias between the gold layer and the silicon substrate.

Schildkraut, "Long Range Surface Plasmon Electrooptic Modulator", Applied Physics, vol. 27, No. 21, Nov. 1, 1988, pp. 4587–4590, discloses in FIG. 1 a long range surface plasmon generator. Schildkraut reports no actual device construction, but basis calculations on the assumption that electrooptic film is modeled as a noncentrosymmetric organic film having a $\chi^{(2)}zzz = 2 \times 10^{-7}$ esu.

Yeatman et al., "Surface Plasmon Spatial Light Modulators", SPIE, Vol. 1151, Optical Information Processing Systems and Architecture, pp. 522-532 (1989), suggests the use of a surface plasmon device as a spatial light modulator (SLM). In a broad theoretical sense this is achieved merely by segmenting the counter electrode so that each segment can be separately biased for imaging purposes. In an experimental construction, shown in FIG. 5, a silver layer is coated on the base of high index prism and glass slide and a liquid crystal composition is confined between the silver layer and a counter electrode with thin magnesium fluoride alignment layers being interposed. The counter electrode is divided into segments. A Mylar TM spacer of from 6 to 10 μm in thickness is glued between the counter electrode and silver layer to confine the liquid crystal composition. Yeatman et al. suggests alternatively employing a semiconductor depletion region or a Langmuir-Blodgett (LB) film as a replacement for the liquid crystal electrooptic medium, contemplated constructions of each being shown in FIGS. 8 and 9, respectively. Yeatman et al. does not address the construction of long range surface plasmon spatial light modulators.

RELATED PATENT APPLICATIONS

Schildkraut et al. OPTICAL ARTICLE FOR REFLECTION MODULATION U.S. Ser. No. 419,817, filed Oct. 11, 1989, commonly assigned, now U.S. Pat. No. 4,917,426, discloses a long range surface plasmon device in which the electrooptic medium is exhibits a second order polarization susceptibility of greater than $10^{-9}$ esu and the dielectric layer is comprised of a metal oxide or fluoride or a low molecular weight aromatic compound.

Rider et al. HIGH $\chi^{(2)}$ OPTICAL ARTICLE U.S. Ser. No. 419,984, filed Oct. 11, 1989, now U.S. Pat. No. 4,948,225, commonly assigned, discloses a long range surface plasmon device in which a metal fluoride and oxide layer of a thickness of less than 0.1 μm between the reflective metal layer and the electrooptic medium, the reflective metal layer is a moderate work function metal, and the electrooptic medium is a poled polymeric medium having a glass transition temperature of at least 50° C.

Scozzafava et al. HIGH $\chi^{(2)}$ OPTICAL ARTICLE WITH IMPROVED BUFFER LAYER U.S. Ser. No. 419,819, filed Oct. 11, 1989, commonly assigned, now U.S. Pat. No. 4,946,235 discloses an optical article with a high $\chi^{(2)}$ poled polymeric medium formed on a buffer layer comprised of low molecular weight aromatic compound and a metal fluoride or oxide.

Scozzafava et al. AN IMPROVED NONLINEAR OPTICAL DEVICE, U.S. Ser. No. 419,818, filed Oct. 11, 1989, commonly assigned, now U.S. Pat. No. 4,946,235, discloses an optical article containing an organic layer for the nonlinear propagation of electromagnetic radiation and a buffer layer overlying the organic layer comprised of a low molecular weight aromatic compound.

Schildkraut et al. OPTICAL ARTICLE FOR MULTICOLOR IMAGING, U.S. Ser. No. 583,620 now U.S. Pat. No. 5,075,796, filed concurrently herewith and commonly assigned, discloses an optical article capable of independently modulating the reflection and internal propagation of electromagnetic radiation of three different wavelengths in three different zones to produce a multicolor image in a photographic element. In one form the reflective metal layer or counter electrode in each of the zones can be segmented to allow each segment to be independently electrically biased.

SUMMARY OF THE INVENTION

The present invention makes available to the art for the first time a long range surface plasmon device capable of acting as a spatial light modulator—i.e., an LRSPSLM. The devices of this invention are both more convenient to use and to construct than the devices of the prior art discussed above. The devices contain no liquid components. It is unnecessary for the user to be concerned with maintaining a liquid or air spacing between components to achieve sought after performance. The device employs a single support element on which all other elements can be formed as solid layers. All of the materials employed to form layers of the device can be conveniently formed in their required thicknesses.

In one aspect, this invention is directed to an optical article capable of modulating the reflection of polarized monochromatic electromagnetic radiation comprised of a reflective metal layer, means acting as a support for directing polarized electromagnetic radiation to the reflective metal layer, an electrooptic medium that exhibits a refractive index which is a function of an applied electrical potential, and a counter electrode, at least one of the reflective metal layer and the counter electrode taking the form of laterally spaced segments. The device is characterized in that the reflective metal layer has a thickness of less than 0.5 μm, a dielectric layer is interposed between the reflective metal layer and the support having a refractive index less than that of said support and a thickness in the range of from 0.1 to 10 times the wavelength of the electromagnetic radiation, the dielectric layer being comprised of at least one metal oxide, metal fluoride, or low molecular weight aromatic compound, the electrooptic medium is a polymeric layer coated on the reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety, and the polymeric layer exhibiting a refractive index which differs from that of the dielectric layer by less than 20 percent in the absence of an applied electrical potential.

DESCRIPTION OF PREFERRED EMBODIMENTS

Figure 1:
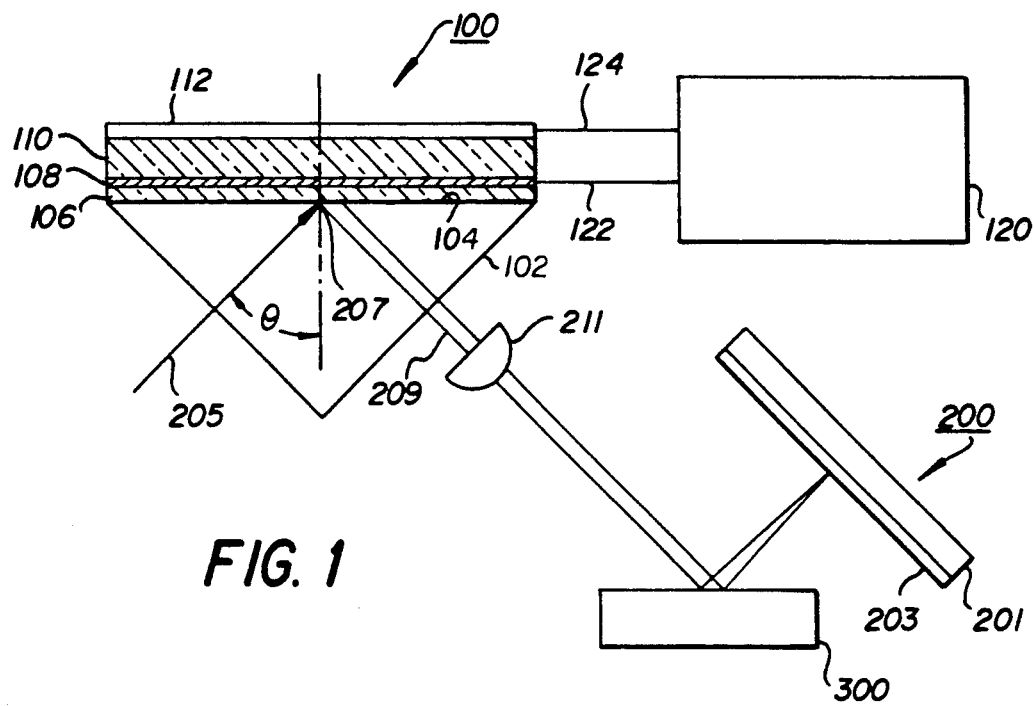
FIG. 1 is an elevation, partly in section, of a first preferred embodiment of the invention.
Figure 2:
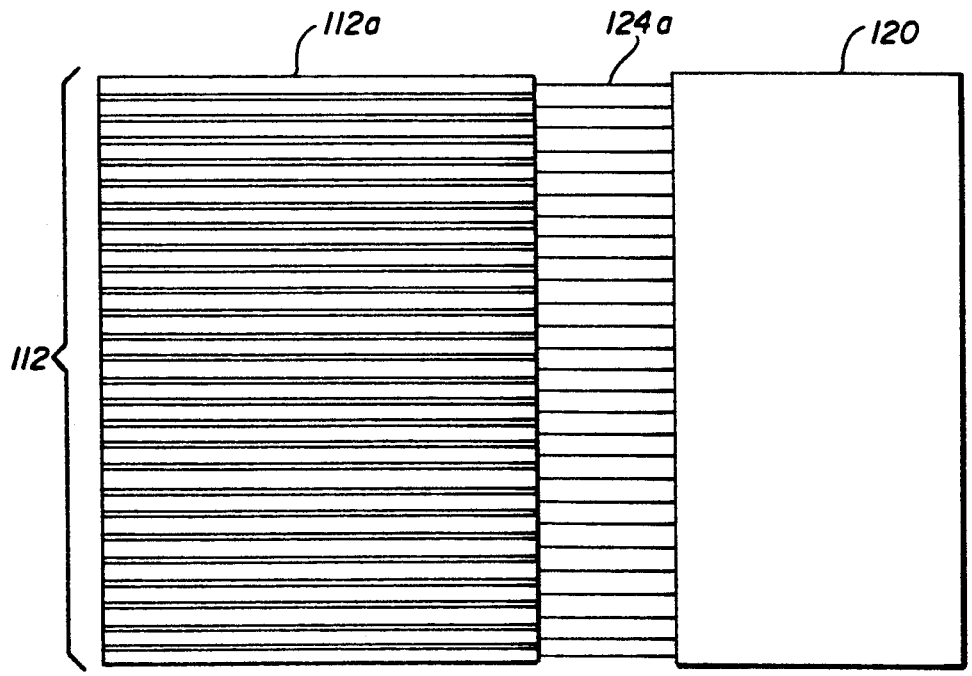
FIG. 2 is a plan view of the first preferred embodiment.

Referring to FIGS. 1 and 2, a modulator 100 is shown consisting of a prism 102, which serves a support for the device. On the base 104 of the prism is located a dielectric layer 106 having a lower index of refraction than the prism, a reflective metal layer 108, an electrooptic medium 110 in the form of a polymeric layer, and a counter electrode 112 divided into a plurality of laterally spaced segments of which segment 112a is representative. The modulator is shown attached to an imaging controller 120. An electrical conduction path from the controller to the reflective metal layer is indicated at 122. A plurality of electrical conduction paths 124 are shown each connecting the controller to one of the counter electrode segments. Representative conduction path 124a is shown connected to counter electrode segment 112a.

By selectively controlling the potential difference between the metal reflective layer and each of the individual segments of the counter electrode it is possible to bias the modulator so that in selected segment areas the modulator exhibits maximum reflection of polarized monochromatic electromagnetic radiation directed toward it and in other selected segment areas the modulator exhibits minimum reflection of that same radiation. By using just maximum and minimum reflection biasing it is possible to produce half tone images. It is also possible to modulate reflection intensity over the full range from maximum to minimum reflection to produce continuous tone images.

Use can be illustrated by considering the exposure of a photographic element 200, comprised of a support 201 and an image recording portion 203 coated on the support, by reflections from the modulator in areas controlled by representative counter electrode segment 112a. As shown in FIG. 1 the modulator is addressed by a beam of polarized monochromatic electromagnetic radiation indicated by arrow 205 directed at a point of incidence 207 with the dielectric layer 106 in an area of the modulator underlying selected segment 112a. The beam forms an angle of incidence $\Theta$ measured from an axis normal to the dielectric layer. The potential biasing supplied by the controller 120 to the reflective metal layer 108 through conduction path 122 and the counter electrode segment 112a through conduction path 124a is as shown intermediate between that required for either maximum or minimum reflection. A portion of the incident electromagnetic radiation is propagated within the modulator along the interfaces of the reflective metal layer as a long range surface plasmon or the electrooptic medium as a guided mode. This occurs because the potential gradient applied by the counter electrode segment 112a has resulted in locally adjusting the refractive index of the electrooptic medium 110 to a level that permits coupling of the wavefronts at the opposite interfaces of the reflective metal layer.

When the potential difference is adjusted for optimum internal propagation, very little, it any, of the incident beam is reflected from the device. When the potential difference is adjusted to prevent internal propagation, the incident beam is specularly reflected from the device with no significant spreading.

With intermediate biasing, as shown, the reflected beam 209 is slightly spread in the direction of propagation within the device, since evanescent fractions of the electromagnetic radiation can emerge from the device at displacements of up to 100 μm from the point of incidence. However, the intensity of the reflected beam falls off sharply with its displacement from the point of incidence. No significant spreading of the incident beam normal to the longitudinal axis of the segment 112a occurs, since the beam lacks lateral propagation momentum. Hence, no significant lateral spreading of electromagnetic radiation between counter electrode segment areas occurs.

A lens 211 is provided to focus the reflected beam for exposure of the image recording portion of the photographic element. Since beam spreading occurs in only one plane, a hemicylindrical lens is sufficient to focus the reflected beam incident upon the image recording portion 203 of the photographic element 200. As shown a mirror 300 is positioned to intercept and reflect the beam 209 to the image recording portion of the photographic element.

If beam 205 is essentially a point source of electromagnetic radiation, imagewise exposing the photographic element requires sequentially addressing the various segment areas of the modulator and reflecting the beam 209 to different areas of the photographic element by adjusting the relative positioning of one or more of the beam 205, the modulator 100, the lens 211, the mirror 300 and the photographic element 200.

The simplest and preferred scanning approach the beam 205 is a laterally expanded line that concurrently impinges on all of the segment areas of the modulator, but over only a narrow portion of each segment area. The hemicylindrical lens 211 now transfers a line exposure to the mirror 300 and the photographic element 200 in one step. Between each successive laterally displaced line exposure of the photographic element, the biasing of the segments of the electrode 112 are adjusted to permit selective internal propagation or reflection as required for imaging and the mirror 300 is reoriented. This approach offers the advantage that the beam 205, modulator, lens and photographic element all remain in a fixed relative spatial relationship during imaging and the mirror alone requires physical manipulation.

The angle at which the beam 205 strikes the dielectric layer 106 determines whether the modulator internally propagates the beam by generating long range surface plasmons or internally guided modes. At the highest angle of incidence $\Theta$ that produces internal propagation internal long range surface plasmon propagation occurs. At lower values of $\Theta$ internal guided mode propagation occurs. A choice of angles are available for achieving guided mode operation. Generally best results are achieved at the first (zero order) guided mode angle first encountered following the long range surface plasmon producing angle. Appropriate angles of incidence of the polarized monochromatic electromagnetic radiation can be calculated from known physical relationships. Optimum angles can also be readily determined simply by varying the angles of incidence and observing the optimum angles for modulation.

Although the prism 102 is shown as the support for the modulator, it is appreciated that the optical articles of this invention can be formed on any convenient conventional optical coupling element. For example, the prism can be replaced with an optical grating.

In one preferred form the dielectric layer can be a metal oxide or fluoride layer. Since oxygen and fluorine generally form relatively inert stable compounds with metals, it is apparent that the dielectric layer can be formed from a broad selection of metal fluorides and oxides. Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional technique for depositing the metal fluoride or oxide layer compatible with the surface onto which deposition is intended can be undertaken. Vacuum vapor deposition, sputtering, chemical vapor desposition, molecular beam epitaxy, liquid phase epitaxy, electrolytic oxidative coating, and similar conventional coating processes can be employed. These deposition techniques lend themselves particularly to forming layers of less than 0.1 μm in thickness.

It is specifically contemplated to form metal fluoride coatings by the thermal decomposition of a metal carboxylate (e.g., a metal acetate or 2-ethylhexanoate) in the presence of fluorinating agent (e.g., heptafluorobutyric acid). This method is the subject matter of Paz-Pujalt U.S. Ser. No. 377,646, filed Jul. 10, 1989, titled METHOD OF FORMING METAL FLUORIDE FILMS BY THE DECOMPOSITION OF METALLOORGANIC FILMS IN THE PRESENCE OF A FLUORINATING AGENT, commonly assigned.

Instead of forming the dielectric layer of a metal oxide or fluoride, in an alternative preferred form of the invention the dielectric layer is formed of one or more amorphous low molecular weight aromatic compounds.

By "amorphous" it is meant that there is substantially no crystallinity in the layer or microstructure attributed to the coating process. This can be determined by visual inspection under a microscope; by Raman spectroscopic techniques; or by the observation of scattered light from the modulator.

The term "low molecular weight" is employed to designate those aromatic compounds having a molecular weight below about 1000. In other words, film forming polymers, which typically have a molecular weight of at least 5000, are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds contain at least one aromatic carbocyclic or heterocyclic ring. In a preferred form the compounds can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidenebis(2,6-dibromophenyl); 3',3'',5',5''-tetrabromophenolphthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-dibenzo[c,h]xanthenediol; 9,9-dimethylxanthene-3,6-bis(oxyacetic acids); 4,4'-(3-phenyl-1-indanylidene)diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, Feb. 1974, and U.S. Pat. Nos. 3,803,096, 3,859,364 and 3,886,124 and the phenylindan diamines of U.S. Pat. Nos. 3,897,253 and 3,915,939, B. The 1,1'-spirobiindan diols and diamines disclosed in U.S. Pat. No. 3,725,070; and the 1,1'-spirobiindan (dicarboxylic acids) of *Research Disclosure*, Item No. 9830, Jun. 1972 (anonymous), C. The 1,1'-spirobiindan-5,5'-diamines disclosed in *Research Disclosure*, Item No. 13117, Mar. 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, Jun. 1972 (anonymous), G. The 4,4'-(3-phenyl-1-indanylidene)diphenols disclosed in *Research Disclosure*, Item No. 13101, Mar. 1975, H. The 4,4'-(hexahydro-4,7-methanoindan-5-ylidene)diphenols disclosed in *Research Disclosure*, Item No. 13568, Jul. 1975, I. The bisphenols disclosed in *Research Disclosure*, Item No. 13569, Jul. 1975, J. The sulfonyldibenzoic acids disclosed in *Research Disclosure*, Item No. 14016, Dec. 1975, K. The polycyclic norbornanes of *Research Disclosure*, Item No. 9207, Dec. 1971, and L. The 1,2,3,4-tetrahydronaphthalenes disclosed in *Research Disclosure*, Item No. 13570, Jul. 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

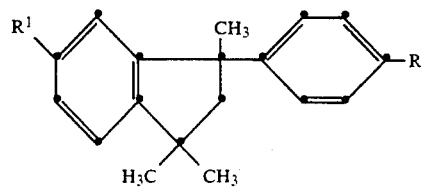

wherein R and R¹ are independently selected from the group consisting of nitro, amino, carboxyl, formamido groups, carbamoyl groups and heterocyclic groups derived from amino or carboxyl groups.

Useful formamido and carbamoyl groups are represented by the formulae —NHCOR² and —CONR²R³ respectively, wherein R² and R³ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

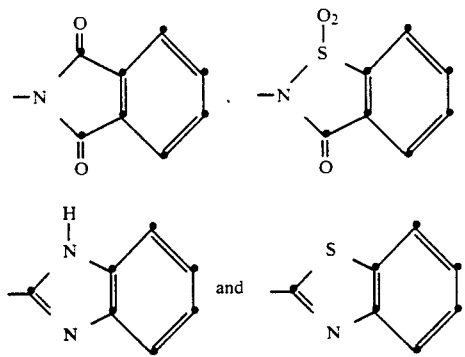

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and R¹ are different, mixtures of the side chain precursors are used and the compound isolated by liquid chromotography. In preferred embodiments there is no need to resolve the mixture as it is useful directly.

Exemplary preferred phenylindan compounds are listed in Table I. All of the refractive indices reported in this table and subsequently were measured at 632 nm.

TABLE I

[Phenylindan core structure with two R groups on the two phenyl rings, CH₃ on the quaternary carbon, and two CH₃ groups (H₃C, CH₃) on the indan carbon]

| Compound | R | Refractive Index | Tg °C. |
|---|---|---|---|
| TEL-1 | —CONH₂ | 1.613 | 110 |
| TEL-2 | —NHCO—C₆H₄—OCH₃ (para-methoxyphenyl amide) | 1.630 | 114 |
| TEL-3 | —NHCO—C₆H₄—Cl (para-chlorophenyl amide) | 1.629 | 118 |
| TEL-4 | —NHCO—C₆H₄—Br (para-bromophenyl amide) | 1.647 | 134 |
| TEL-5 | —NHCO—C₆H₄—CN (para-cyanophenyl amide) | 1.677 | 138 |
| TEL-6 | —NHCO—C₆H₅ (phenyl amide) | 1.634 | 114 |
| TEL-7 | —NHCO—C₆H₃(Cl)₂ (3,4-dichlorophenyl amide) | 1.649 | 127 |
| TEL-8 | —NHCO—C₆F₅ (pentafluorophenyl amide) | 1.548 | 123 |
| TEL-9 | —NHCO—naphthyl | 1.656 | 133 |
| TEL-10 | —CONH—C₆H₄—Br (para-bromophenyl carbamoyl) | 1.659 | 136 |

TABLE I-continued

R—[benzene ring]—C(CH3)—[benzene ring]—R with H3C—C—CH3 bridge

| Compound | R | Refractive Index | Tg °C. |
|---|---|---|---|
| TEL-11 | —NHCO—[phenyl] | 1.569 | 150 |
| TEL-12 | —NHCOCH₂C(CH₃)₃ | 1.537 | 112 |
| TEL-13 | —NHCOCH₂CH₂CH₃ | 1.572 | 78 |
| TEL-14 | —NHCOCF₂CF₂CF₃ | 1.472 | 60 |
| TEL-15 | —CON—[phenyl]₂ | 1.548 | 99 |
| TEL-16 | —CONHC(CH₃)(CH₃)—CH₂CH₃ | 1.545 | 86 |
| TEL-17 | —N(phthalimide with CH₃) | 1.660 | 128 |
| TEL-18 | Mixture of —NHCO—[phenyl]—Br and —NHCO—[naphthyl] | 1.654 | 121 |

TABLE I-continued

| Compound | R | Refractive Index | Tg °C. |
|---|---|---|---|
| | —NHCO—[phenyl]—OCH₃ | | |

Preferred phthalimide compounds are disclosed by Machiele et al U.S. Pat. Ser. No. 273,550, filed Nov. 21, 1988, commonly assigned. The phthalimide compounds have the structure:

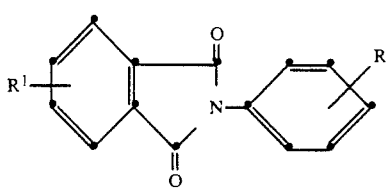

wherein R and R¹ are as defined above.

The symmetrically substituted compounds, that is R=R¹, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

Exemplary phthalimides are listed in Table II.

TABLE II

| TEL-19 | Br—[phenyl]—CONH—[phthalimide]—N—[phenyl]—NHCO—[phenyl]—Br | Index: 1.703 (second sample index = 1.705) mp: >240° |
|---|---|---|

TABLE II-continued
TEL-20 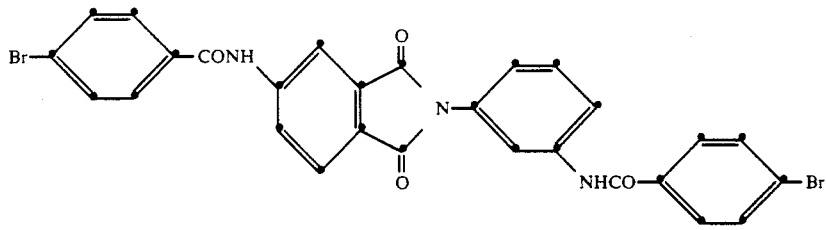 Index: 1.776
mp: >240°
TEL-21 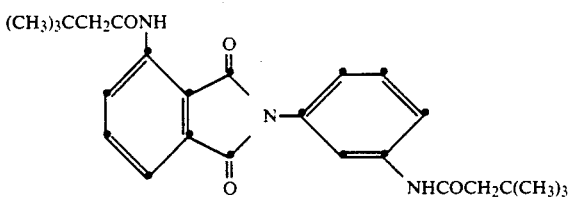 Index: 1.578
mp: 197–200°
TEL-22 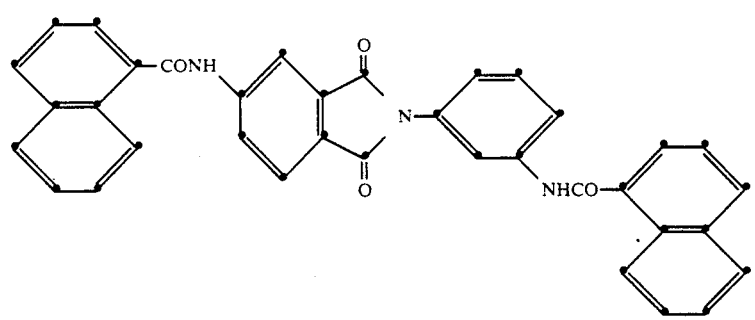 Index: 1.670
mp: >240°
TEL-23 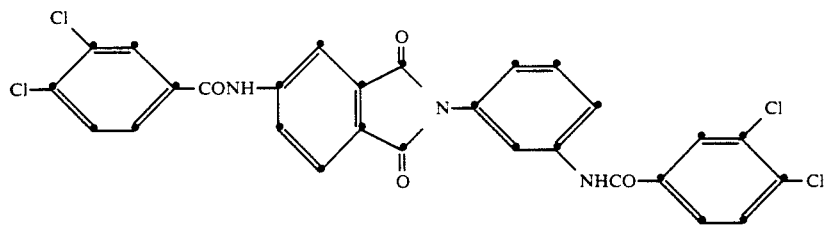 Index: 1.737
mp: >240°
TEL-24 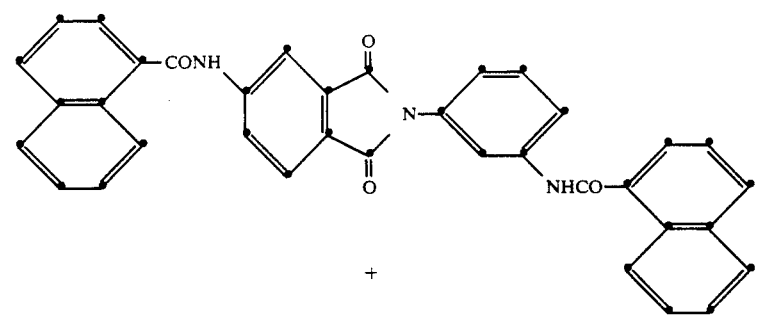 Index: 1.744
(50:50 mixture co-evaporated from sources)
+
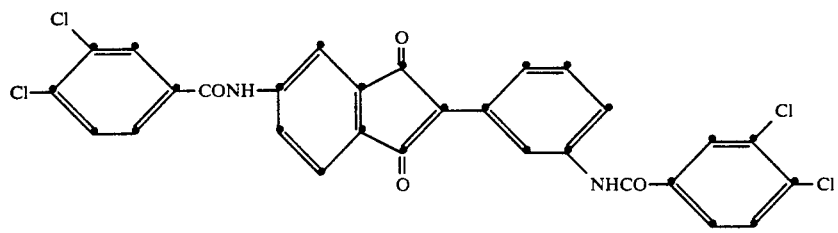

TABLE II-continued
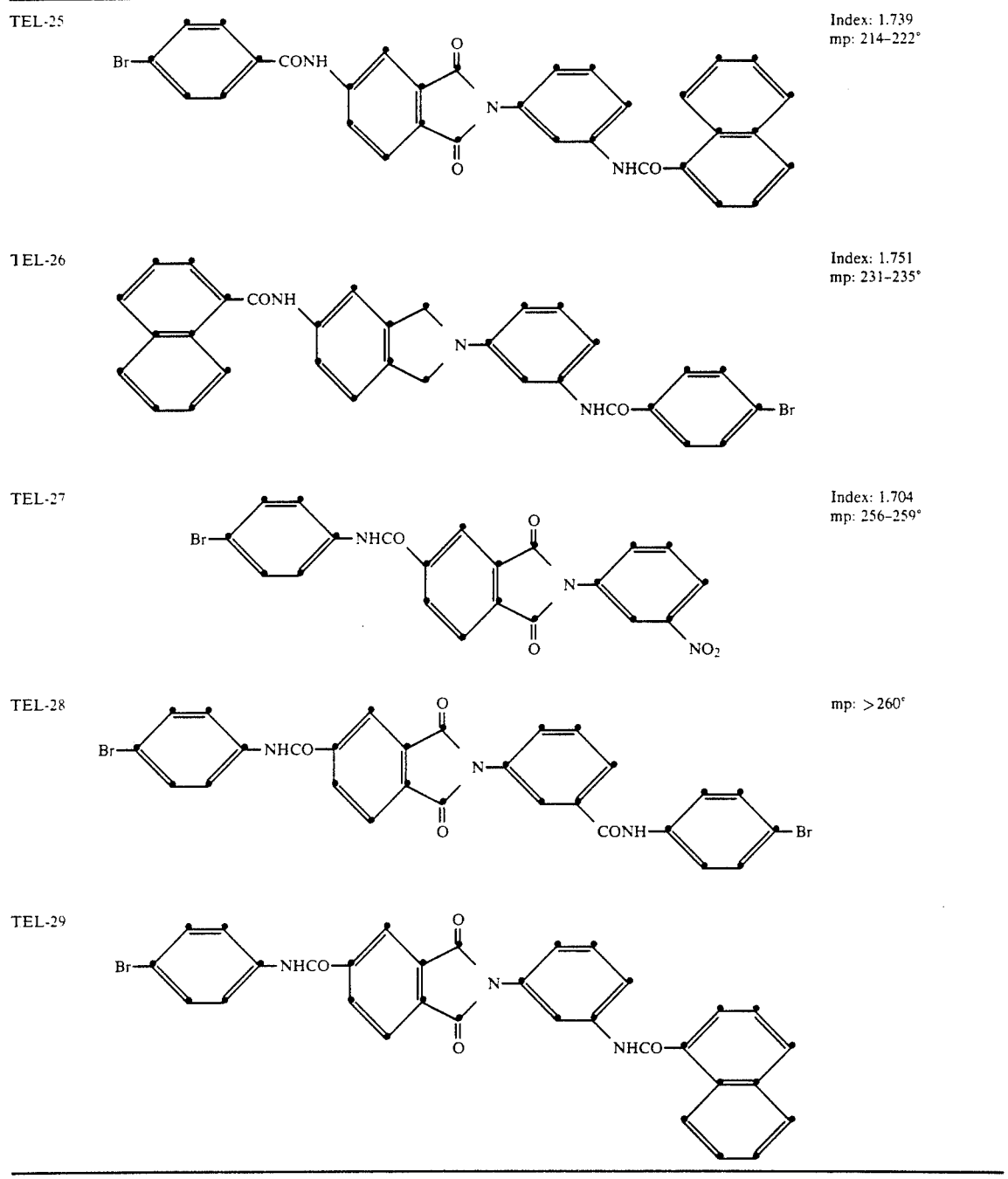
| | | |
|---|---|---|
| TEL-25 | | Index: 1.739<br>mp: 214–222° |
| TEL-26 | | Index: 1.751<br>mp: 231–235° |
| TEL-27 | | Index: 1.704<br>mp: 256–259° |
| TEL-28 | | mp: >260° |
| TEL-29 | | |
Still other exemplary low molecular weight aromatic compounds useful as transmission enhancement layers in the practice of this invention are listed in Table III.
TABLE III
| Compound | R | Refractive Index |
|---|---|---|
| TEL-30, -31, -32 | | |

TABLE III-continued

| Compound | R | Refractive Index |
|---|---|---|
| (RHN-substituted spirobifluorene structure) | —COCH$_2$C(CH$_3$)$_3$<br>—H<br>—CO—C$_6$H$_4$—Br | 1.599<br>1.701<br>1.708 |
| TEL-33, -34 (tetrabromo RO-substituted spirobifluorene) | —COCH$_2$C(CH$_3$)$_3$<br>—OH | 1.572<br>1.659 |
| TEL-35, -36, -37 (dimethyl-substituted RO spirobifluorene) | —COCH$_2$C(CH$_3$)$_3$<br>—H<br>—CO—C$_6$H$_4$—Br | 1.514<br>1.575<br>1.610 |
| TEL-38, -39, -40 (NHR-substituted phthalimide structure) | —COCH$_2$C(CH$_3$)$_3$<br>—H<br>—CO—C$_6$H$_4$—Br | 1.578<br>1.755<br>1.731 |

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

The dielectric layer coated on the support has a thickness in the range of from 0.1 to 10 (preferably 0.3 to 5) times the wavelength of the electromagnetic radiation. Metal oxides, metal fluorides, and mixtures of these inorganic materials, hereinafter also referred to as category (a) materials, are preferably used alone for forming first dielectric layers of less than 0.1 μm. When it is preferred to form the dielectric layer of a greater thickness, it is preferred to employ one or a combination of the low molecular weight aromatic compounds described above, hereinafter referred to as category (b) materials. Category (a) materials are more stable and more resistant to solvents than category (b) materials, but have the disadvantage that they do not conveniently form smooth, uniform layers within the highest thickness ranges of the dielectric layer contemplated by the invention. Category (b) materials readily form smooth thicker layers, but with the disadvantages indicated. By employing category (a) and (b) materials in combination it is possible to realize both the greater layer thickness capabilities of category (b) materials and the enhanced stabilities of category (a) materials. It is preferred to employ category (a) and (b) materials in combination in weight ratios of (a):(b) of from 20:80 to 90:10 (preferably 50:50 to 80:20). Blends of category (a) and (b) materials can be readily obtained by concurrent vacuum vapor deposition.

The electrooptic medium 110 forms a layer that varies in its refractive index as a function of the potential gradient to which it is subjected. It can be constructed of any polymeric medium exhibiting a high ($>10^{-9}$ esu) second order polarization susceptibility containing organic molecular dipoles containing an electron donor moiety linked through a conjugated $\pi$ bonding system to an electron acceptor medium. The organic molecular dipole can itself form a part of a polymer as a repeating unit in the polymer backbone or, more commonly, as a pendant group. Alternatively, the organic molecular dipole can be present as a separate compound physically blended with a polymer binder. The polymer portion of the layer can be either a linear or a crosslinked polymer.

A wide variety of organic molecular dipoles suitable for use in the practice of this invention as well as polymers, forming a part of the organic molecular dipoles or employed as separate binders, are known and are exemplified by the following:

NLO-1. Williams, "Organic Polymeric and Non-Polymeric Materials with Large Optical Nonlinearities", *Angew. Chem.* Int. Ed. Engl. 23 (1984), pp. 690–703;

NLO-2. Garito U.S. Pat. No. 4,536,450, issued Aug. 20, 1985;

NLO-3. European Patent Application 0,186,999, published Jul. 9, 1986;

NLO-4. Zyss, "Nonlinear Organic Materials for Integrated Optics", *Journal of Molecular Electronics*, vol. 1, pp. 25–45;

NLO-5. Choe U.S. Pat. No. 4,603,187, issued Jul. 29, 1986;

NLO-6. Choe et al U.S. Pat. No. 4,707,305, issued Nov. 17, 1987;

NLO-7. Choe et al U.S. Pat. No. 4,667,042, issued May 19, 1987;

NLO-8. Choe et al U.S. Pat. No. 4,650,609, issued Mar. 17, 1987;

NLO-9. Choe U.S. Pat. No. 4,579,915, issued Apr. 1, 1986;

NLO-10. DeMartino U.S. Pat. No. 4,720,355, issued Jan. 19, 1988;

NLO-11. Choe et al U.S. Pat. No. 4,732,783, issued Mar. 22, 1988;

NLO-12. Kobayashi et al, Chemical Physics Letters, vol. 121, No. 4,5, pp. 356–360, Nov. 15, 1985;

NLO-13. DeMartino U.S. Pat. No. 4,766,171, issued Aug. 23, 1988;

NLO-14. DeMartino et al U.S. Pat. No. 4,694,066, issued Sept. 15, 1987;

NLO-15. DeMartino et al U.S. Pat. No. 4,835,235, issued May 30, 1989;

NLO-16. Choe U.S. Pat. No. 4,711,532, issued Dec. 8, 1987;

NLO-17. Choe U.S. Pat. No. 4,694,048, issued Sept. 15, 1987;

NLO-18. Choe U.S. Pat. No. 4,703,096, issued Oct. 27, 1987;

NLO-19. Choe U.S. Pat. No. 4,719,28, issued Jan. 12, 1988;

NLO-20. Milverton et al U.S. Pat. No. 4,818,616, issued Apr. 4, 1989;

NLO-21. Leslie et al U.S. Pat. No. 4,796,976, issued Jan. 10, 1989;

NLO-22. Choe U.S. Pat. No. 4,804,255, issued Feb. 14, 1989;

NLO-23. Leslie U.S. Pat. No. 4,801,659, issued Jan. 31, 1989;

NLO-24. Leslie U.S. Pat. No. 4,807,968, issued Feb. 28, 1989;

NLO-25. Teng et al U.S. Pat. No. 4,775,215, issued Oct. 4, 1988;

NLO-26. Robin et al U.S. Pat. No. 4,794,045, issued Dec. 27, 1988;

NLO-27. Gillberg-LaForce et al U.S. Pat. No. 4,728,576, issued Mar. 1, 1988;

NLO-28. DeMartino U.S. Pat. No. 4,779,961, issued Oct. 25, 1988;

NLO-29. DeMartino U.S. Pat. No. 4,757,130, issued Jul. 22, 1988;

NLO-30. Choe U.S. Pat. No. 4,824,219, issued Apr. 25, 1989;

NLO-31. Ulman et al U.S. Pat. No. 4,792,208, issued Dec. 20, 1988;

NLO-32. DeMartino et al U.S. Pat. No. 4,808,332, issued Feb. 28, 1989;

NLO-33. Robello et al U.S. Pat. No. 4,796,971, issued Jan. 10, 1989;

NLO-34. DeMartino et al U.S. Pat. No. 4,822,865, issued Apr. 18, 1989;

NLO-35. DeMartino et al U.S. Pat. No. 4,801,670, issued Jan. 31, 1989;

NLO-36. Robello U.S. Pat. No. 4,900,127, issued Feb. 13, 1990;

NLO-37. Scozzafava et al U.S. Pat. No. 4,886,339, issued Dec. 12, 1981.

Specifically preferred organic nonlinear optical layers are those which can be formed by poling linear condensation and vinyl polymers including noncentrosymmetric molecular dipoles as pendant or backbone groups. The molecular dipoles include an electron donor moiety, such as an amino, oxy, or thio group, linked through a conjugated $\pi$ bonding system to an electron acceptor moiety, such as a sulfonyl, cyano, or nitro group, to permit oscillation of the molecular dipole between a lower polarity ground state and a higher polarity excited state. A preferred conjugated $\pi$ bonding system is provided by a 4,4'-stilbene or 4,4'-diazobenzene linkage between the electron acceptor or electron donor moiety. The molecular dipole can be immobilized by a separate crosslinked polymeric binder, as illustrated by NLO-37; as linked to the polymer backbone through the electron donor or acceptor moiety, as illustrated by NLO-31; or incorporated in the polymer backbone by linkages through both the electron acceptor and donor moieties, as illustrated bu NLO-36.

The following are illustrative of preferred molecular dipole monomers suitable for producing condensation polymers that can be poled to form the nonlinear optical layers:

TABLE IV

NOCM-1 4'-}N-[5-(Methoxycarbonyl)pentyl]-N-methylamino}-4-(6-hydroxyhexyl)sulfonylazobenzene NOCM-2 4'-{N-[5-(Butoxycarbonyl)pentyl]-N-methylamino}-4-(6-hydroxyhexyl)sulfonylazobenzene NOCM-3 4'-{N-[5-(Methoxycarbonyl)pentyl]-N-methylamino}-4-(6-hydroxyhexyl)sulfonylstilbene NOCM-4 4'-{N-[5-(Butoxycarbonyl)pentyl]-N-methylamino}-4-(6-hydroxyhexyl)sulfonylstilbene NOCM-5 4'-[N-(Methoxycarbonyl)methyl-N-methylamino]-4-(6-hydroxyhexyl)sulfonylazobenzene
NOCM-6 4'-[N-(Ethoxycarbonyl)methyl-N-methylamino]-4-(6-hydroxyhexyl)sulfonylazobenzene
NOCM-7 4'[N-(Methoxycarbonyl)methyl-N-methylamino]-4-(6-hydroxyhexyl)sulfonylstilbene
NOCM-8 4'[N-(Ethoxycarbonyl)methyl-N-methylamino]-4-(6-hydroxyhexyl)sulfonylstilbene
NOCM-9 4'[N-(6-Hydroxyhexyl)-N-methylamino]-4-[2-(methoxycarbonyl)ethyl]sulfonylazobenzene
NOCM-10 4'-[N-(6-Hydroxyhexyl)-N-methylamino]-4-[2-(ethoxycarbonyl)ethyl]sulfonylazobenzene
NOCM-11 4'-[N-(6-Hydroxyhexyl)-N-methylamino]-4-[2-(methoxycarbonyl(ethyl]sulfonylstilbene
NOCM-12 4'-[N-(6-Hydroxyhexyl)-N-methylamino]-4-[2-(ethoxycarbonyl)ethyl]sulfonylstilbene
NOCM-13 4'-[N-(2-Hydroxyethyl)-N-methlyamino]-4-[2-(methoxycarbonyl)ethyl]sulfonylazobenzene
NOCM-14 4'-[N-(2-Hydroxyethyl)-N-methylamino]-4-[2-(ethoxycarbonyl)ethyl]sulfonylazobenzene
NOCM-15 4'-[N-(2-Hydroxyethyl)-N-methylamino]-4-[2-(methoxycarbonyl)ethyl]sulfonylstilbene
NOCM-16 4'-[N-(2-Hydroxyethyl)-N-methylamino]-4-[2-(ethoxycarbonyl)ethyl]sulfonylstilbene
NOCM-17 4'-[N-(2-hydroxyhexyl)-N-methylamino]-4-[5-(methoxycarbonyl)pentyl]sulfonylazobenzene
NOCM-18 4'-[N-(2-Hydroxyhexyl)-N-methylamino]-4-[5-(methoxycarbonyl)pentyl]sulfonylstilbene
NOCM-19 4'-(4-Hydroxy-1-piperidinyl)-4-[2-(methoxycarbonyl)ethyl]sulfonylazobenzene
NOCM-20 4'-(4-Hydroxy-1-piperidinyl)-4-[2-(methoxycarbonyl)ehtyl]sulfonylstilbene The following are illustrative of preferred molecular dipole monomers suitable for producing vinyl polymers that can be poled to form the nonlinear optical layers:

TABLE V

NOVM-1 4'-[N-(2-acryloyloxyethyl-N-methylamino]-4-methylsulfonylstilbene
NOVM-2 4'-[N-(2-methacryloyloxyethyl-N-methylamino]-4-methylsulfonylstilbene
NOVM-3 4'-[N-(6-acryloyloxyhexyl)-N-methylamino]-4-methylsulfonylstilbene
NOVM-4 4'-[N-(6-methacryloyloxyhexyl)-N-methylamino]-4-methylsulfonylstilbene
NOVM-5 4'-[4-acryloyloxy-1-piperidyl]-4-methylsulfonylstilbene
NOVM-6 4'-[4-methacryloyloxy-1-piperidyl]-4-methylsulfonylstilbene
NOVM-7 4'-[N-(2-acryloyloxyethyl)-N-methylamino]-4-phenylsufonylstilbene
NOVM-8 4'-[N-(2-methacryloyloxyethyl)-N-methylamino]-4-phenylsulfonylstilbene
NOVM-9 4'-[N-(6-acryloyloxyhexyl)-N-methylamino]-4-phenylsulfonylstilbene
NOVM-10 4'-[N-(6-methacryloyloxyhexyl)-N-methylamino]-4-phenylsulfonylstilbene
NOVM-11 4'-[4-acryloyloxy-1-piperidyl]-4-phenylsulfonylstilbene
NOVM-12 4'-[4-methacryloyloxy-1-piperidyl]-4-phenylsulfonylstilbene
NOVM-13 4'-[N-(2-acryloyloxyethyl)-N-methylamino]-4-(R-2-methylbutyl)sulfonylstilbene
NOVM-14 4'-[N-(2-methacryloyloxyethyl)-N-methylamino]-4-(R-2-methylbutyl)sulfonylstilbene
NOVM-15 4'-[N-(6-acryloyloxyethyl)-N-methylamino]-4-(R-2-methylbutyl)sulfonylstilbene
NOVM-16 4'-[N-(6-methacryloyloxyethyl)-N-methylamino]-4-(R-2-methylbutyl)sulfonylstilbene
NOVM-17 4'-[4-acryloyloxy-1-piperidyl]-4-(R-2-methylbutyl)sulfonylstilbene
NOVM-18 4'-[4-methacryloyloxy-1-piperidyl]-4-(R-2-methylbutyl)sulfonylstilbene
NOVM-19 4'-(2-acryloyloxyethoxy)-4-methylsulfonylstilbene
NOVM-20 4'-(2-methacryloyloxyethoxy)-4-methylsulfonylstilbene
NOVM-21 4'-(6-acryloyloxyhexoxy)-4-methylsulfonylstilbene
NOVM-22 4'-(6-methacryloyloxyhexoxy)-4-methylsulfonylstilbene
NOVM-23 4'-(2-acryloxyethoxy)-4-phenylsulfonylstilbene
NOVM-24 4'-(2-methacryloyloxyethoxy)-4-phenylsulfonystilbene
NOVM-25 4'-(6-acryloyloxyhexoxy)-(4-phenylsulfonylstilbene
NOVM-26 4'-(6-methacryloyloxyhexoxy)-4-phenylsulfonylstilbene
NOVM-27 4'-(2-acryloyloxyethoxy)-4-(R-2-methylbutyl)-sulfonylstilbene
NOVM-28 4'-(2-methacryloyloxyethoxy)-4-(R-2-1-methylbutyl)sulfonylstilbene
NOVM-29 4'-(6-acryloyloxyhexoxy)-4-(R-2-methylbutyl)-sulfonylstilbene
NOVM-30 4'-(6-methacryloyloxyhexoxy)-4-(R-2-methylbutyl)sulfonylstilbene
NOVM-31 4'-(2-acryloyloxyethylthio)-4-methylsulfonylstilbene
NOVM-32 4'-(2-methacryloyloxyethylthio)-4-methylsulfonylstilbene
NOVM-33 4'-(6-acryloyloxyhexylthio)-4-methylsulfonylstilbene
NOVM-34 4'-(6-methacryloyloxyhexylthio)-4-methylsulfonylstilbene
NOVM-35 4'-(2-acryloyloxyethylthio)-4-phenylsulfonylstilbene
NOVM-36 4'-(2-methacryloyloxyethylthio)-4-phenylsulfonylstilbene
NOVM-37 4'-(6-acryloyloxyhexylthio)-4-phenylsulfonylstilbene
NOVM-38 4'-(6-methacryloyloxyhexylthio)-b-phenylsulfonylstilbene
NOVM-39 4'-(2-acryloyloxyethylthio)-4-(R-2-methylbutyl)sulfonylstilbene
NOVM-40 4'-(2-acryloyloxyethylthio)-4-(R-2-methylbutyl)sulfonylstilbene
NOVM-40 4'-(2-methacryloyloxyethylthio)-4-(R-2-methylbutyl)sulfonylstilbene
NOVM-41 4'-(6-acryloyloxyhexylthio-4-(R-2-methylbutyl)sulfonylstilbene
NOVM-42 4'-(6-methacryloyloxyhexylthio-4-(R-2-methylbutyl)sulfonylstilbene
NOVM-43 4'-dimethylamino-4-(6-acryloyloxyhexyl)-sulfonylstilbene
NOVM-44 4'-dimethylamino-4-(6-methacryloyloxyhexyl)-sulfonylstilbene
NOVM-45 4'-(1-pyrrolidino)-4-(6-acryloyloxyhexyl)-sulfonylstilbene
NOVM-46 4'-(1-pyrrolidino)-4-(6-methacryloyloxyhexyl)sulfonylstilbene
NOVM-47 4'-[N-(R-2-methylbutyl)-N-methylamino]-4-(6-acryloyloxyhexyl)sulfonylstilbene NOVM-48 4'-[N-(R-2-methylbutyl)-N-methylamino]-4-(6-methacryloyloxyhexyl)sulfonylstilbene
NOVM-49 4'-methoxy-4-(6-acryloyloxyhexyl)sulfonylstilbene
NOVM-50 4'-methoxy-4-(6-methacryloyloxyhexyl)sulfonylstilbene
NOVM-51 4'(R-2-methylbutoxy)-4-(6-acryloyloxyhexyl)sulfonylstilbene
NOVM-52 4'(R-2-methylbutoxy)-4-(6-methacryloyloxyhexyl)sulfonylstilbene
NOVM-53 4'-methylthio-4-(6-acryloyloxyhexyl)sulfonylstilbene
NOVM-54 4'-methylthio-4-(6-methacryloyloxyhexyl)sulfonylstilbene
NOVM-55 4'-(R-2-methylbutylthio)-4-(6-acryloyloxyhexyl)sulfonylstilbene
NOVM-56 4'-(R-2-methylbutylthio)-4-(6-methacryloyloxyhexyl)sulfonylstilbene
NOVM-57 4'-[N-(2-acryloyloxyethyl)-N-methylamino]-4-methylsulfonylazobenzene
NOVM-58 4'-[N-(2-methacryloyloxyethyl)-N-methylamino]-4-methylsulfonylazobenzene
NOVM-59 4'[N-(6-acryloyloxyhexyl)-N-methylamino]-4-methylsulfonylazobenzene
NOVM-60 4'[N-(6-methacryloyloxyhexyl)-N-methylamino]-4-methylsulfonylazobenzene
NOVM-61 4'-[4-acryloyloxy-1-piperidyl]-4-methylsulfonylazobenzene
NOVM-62 4'-[4-methacryloyloxy-1-piperidyl]-4-methylsulfonylazobenze
NOVM-63 4'-[N-(2-acryloyloxyethyl)-N-methylamino]-4-phenylsulfonylazobenzene
NOVM-64 4'-[N-2-methacryloyloxyethyl)-N-methylamino]-4-phenylsulfonylazobenzene
NOVM-65 4'-[N-(6-acryloyloxyhexyl)-N-methylamino]-4-phenylsulfonylazobenzene
NOVM-66 4'-[N-(6-methacryloyloxyhexyl)-N-methylamino]-4-phenylsulfonylazobenzene
NOVM-67 4'-[4-acryloyloxy-1-piperidyl]-4-phenylsulfonylazobenzene
NOVM-68 4'-[4-methacryloyloxy-1-piperidyl]-4-phenylsulfonylazobenzene
NOVM-69 4'-[N-(2-acryloyloxyethyl)-N-methylamino]-4-(R-2-methylbutyl)sulfonylazobenzene
NOVM-70 4'-[N-(2-methacryloyloxyethyl)-N-methylamino]-4-(R-2-methylbutyl)sulfonylazobenzene
NOVM-71 4'-[N-(6-acryloyloxyhexyl)-N-methylamino]-4-(R-2-methylbutyl)sulfonylazobenzene
NOVM-72 4'-[N-(6-methacryloyloxyhexyl)-N-methylamino]-4-(R-2-methylbutyl)sulfonylazobenzene
NOVM-73 4'-[4-acryloyloxy-1-piperidyl]-4-(R-2-methylbutyl)sulfonylazobenzene
NOVM-74 4'-[4-methacryloyloxy-1-piperidyl]-4-(R-2-methylbutyl)sulfonylazobenzene
NOVM-75 4'-(2-acryloyloxyethoxy)-4-methylsulfonylazobenzene
NOVM-76 4'-(2-methacryloyloxyethoxy)-4-methylsulfonylazobenzene
NOVM-77 4'-(6-acryloyloxyhexoxy)-4-methylsulfonylazobenzene
NOVM-78 4'-(6-methacryloyloxyhexoxy)-4-methylsulfonylazobenzene
NOVM-79 4'-(2-acryloyloxyethoxy-4-phenylsulfonylazobenzene
NOVM-80 4'-(2-methacryloyloxyethoxy)-4-phenylsulfonylazobenzene
NOVM-81 4'-(6-acryloyloxyhexoxy)-4-phenylsulfonylazobenzene
NOVM-82 4'-(6-methacryloyloxyhexoxy)-4-phenylsulfonylazobenzene
NOVM-83 4'-(2-acryloyloxyethoxy)-4-(R-2-methylbutyl)sulfonylazobenzene
NOVM-84 4'-(2-methacryloyloxyethoxy)-4-(R-2-methylbutyl)sulfonylazobenzene
NOVM-85 4'-(6-acryloyloxyhexoxy)-4-(R-2-methylbutyl)sulfonylazobenzene
NOVM-86 4'-(6-methacryloyloxyhexoxy)-4-(R-2-methylbutyl)sulfonylazobenzene
NOVM-87 4'-(2-acryloyloxyethylthio)-4-methylsulfonylazobenzene
NOVM-88 4'-(2-methacryloyloxyethylthio)-4-methylsulfonylazobenzene
NOVM-89 4'-(6-acryloyloxyhexylthio)-4-methylsulfonylazobenzene
NOVM-90 4'-(6-methacryloyloxyhexylthio)-4-methylsulfonylazobenzene
NOVM-91 4'-(2-acryloyloxyethylthio)-4-phenylsulfonylazobenzene
NOVM-92 4'(2-methacryloyloxyethylthio)-4-phenylsulfonylazobenzene
NOVM-93 4'-(6-acryloyloxyhexylthio)-4-phenylsulfonylazobenzene
NOVM-94 4'-(6-methacryloyloxyhexylthio)-4-phenylsulfonylazobenzene
NOVM-95 4'(2-acryloyloxyethylthio)-4-(R-2-methylbutyl)sulfonylazobenzene
NOVM-96 4'(2-methacryloyloxyethylthio)-4-(R-2-methylbutyl)sulfonylazobenzene
NOVM-97 4'(6-acryloyloxyhexylthio)-4-(R-2-methylbutyl)sulfonylazobenzene
NOVM-98 4'-(6-methacryloyloxyhexylthio)-4-(R-2-methylbutyl)sulfonylazobenzene
NOVM-99 4'-dimethylamino-4-(2-acryloyloxyethyl)sulfonylazobenzene
NOVM-100 4'-dimethylamino-4-(2-methacryloyloxyethyl)sulfonylazobenzene
NOVM-101 4'-dimethylamino-4-(6-acryloyloxyhexyl)sulfonylazobenzene
NOVM-102 4'-dimethylamino-4-(4-(6-methacryloyloxyhexyl)sulfonylazobenzene
NOVM-103 4'-(1-pyrrolidino)-4-(2-acryloyloxyethyl)sulfonylazobenzene
NOVM-104 4'-(1-pyrrolidino)-4-(2-methacryloyloxyethyl)sulfonylazobenzene
NOVM-105 4'-(1-pyrrolidino)-4-(6-acryloyloxyhexyl)sulfonylazobenzene
NOVM-106 4'-(1-pyrrolidino)-4-(6-methacryloyloxyhexyl)sulfonylazobenzene
NOVM-107 4'-dimethylamino-4-(6-acryloyloxyhexyl)sulfonylazobenzene
NOVM-108 4'-dimethylamino-4-(6-methacryloyloxyhexyl)sulfonylazobenzene
NOVM-109 4'-(1-pyrrolidino-4-(6-acryloyloxyhexyl)sulfonylazobenzene
NOVM-110 4'-(1-pyrrolidino-4-(6-methacryloyloxyhexyl)sulfonylazobenzene
NOVM-111 4'-[N-(R-2-methylbutyl)-N-methylamino]-4-(6-acryloyloxyhexyl)sulfonylazobenzene
NOVM-112 4'[N-(R-2-methylbutyl)-N-methylamino]4-(6-methacryloyloxyhexyl)sulfonylazobenzene NOVM-113 4'-methoxy-4-(6-acryloyloxyhexyl)sulfonylazobenzene
NOVM-114 4'-methoxy-4-(6-methacryloyloxyhexyl)sulfonylazobenzene
NOVM-115 4'-(R-2-methylbutoxy)-4-(6-acryloxyhexyl)sulfonylazobenzene
NOVM-116 4'-(R-2-methylbutoxy)-4-(6-methacryloxyhexyl)sulfonylazobenzene
NOVM-117 4'-methylthio-4-(6-acryloxyhexyl)sulfonylazobenzene
NOVM-118 4'-methylthio-4-(6-methacryloxyhexyl)sulfonylazobenzene
NOVM-119 4'-(R-2-methylbutylthio)-4-(6-acryloxyhexyl)sulfonylazobenzene
NOVM-120 4'-(R-2-methylbutylthio)-4-(6-acryloxyhexyl)sulfonylazobenzene
NOVM-121 4'-(9-julolidinyl)-2-[4-(6-acryloyloxyhexylsulfonyl)phenyl]ethene
NOVM-122 4'-(1-butyl-5-indolinyl)-2-[4-(6-methacryloyloxyhexylsulfonyl)phenyl]diimine The following are illustrative of typical vinyl addition monomers that can be copolymerized with the vinyl molecular dipole monomers of Table V, if desired. The vinyl molecular dipole monomers can form 50 to 100 percent of the repeating units of the polymer, with vinyl addition monomers, such as those of Table VI, below, forming the balance of the repeating units of the polymer.

Table VI

VCOM-1 Methyl acrylate
VCOM-2 Ethyl acrylate
VCOM-3 Butyl acrylate
VCOM-4 t-Butyl acrylate
VCOM-5 Methyl chloroacrylate
VCOM-6 Methyl methacrylate
VCOM-7 Ethyl methacrylate
VCOM-8 Butyl methacrylate
VCOM-9 t-Butylmethacrylate
VCOM-10 Styrene
VCOM-11 4-Methylstyrene
VCOM-12 α-Methylstyrene
VCOM-13 4-t-Butylstyrene
VCOM-14 4-Hydroxystyrene
VCOM-15 4-Methoxystyrene
VCOM-16 4-Acetoxystyrene
VCOM-17 2-Vinylnaphthylene
VCOM-18 Acrylonitrile
VCOM-19 Acrylamide
VCOM-20 N-Phenylmaleimide
VCOM-21 N-Vinylpyrrolidone
VCOM-22 Vinylacetate
VCOM-23 Vinylchloride
VCOM-24 Butadiene
VCOM-25 Isoprene
VCOM-26 Chloroprene Conventional details of the construction of the electrooptic medium in the form of a polymeric layer, including layer thickness, are taught in the foregoing NLO citations, the disclosures of which are here incorporated by reference.

The reflective metal layer 105 and the electrode 109 can be formed of any metal or combination of metals conventionally employed to form these layers. Generally metals having at least a moderate (at least 3.5 electron volts, work function are employed.

When the reflective metal layer is a relatively noble metal, preferably a metal having at work function of at least 4.5 electron volts (eV), the high $\chi^{(2)}$ polymeric film can be formed on this layer by any convenient conventional technique. Reflective noble metal layers are particularly suited to use when higher than ambient poling temperatures are employed. For example, it is typical to choose polymeric layers for poling that exhibit a glass transition temperature of at least 50° C. (preferably at least 80° C.). By employing a reflective metal layer having a work function of at least 4.5 eV, it is possible to pole the polymeric layer at a temperature above its glass transition temperature while in direct contact with the reflective metal layer. Illustrative of metals having glass transition temperatures of at least 4.5 eV are tungsten, rhenium, osmium, iridium, platinum, and gold. Of these metals, gold is a particularly preferred metal.

When the reflective metal layer is a moderate (3.5 to 4.5 eV) work function metal any of the above high $\chi^{(2)}$ polymeric film construction techniques can still be employed. However, if the high $\chi^{(2)}$ polymeric film is formed directly on the reflective metal layer, it is preferred to avoid heating to temperatures above 50° C. Further, any solvents associated with the polymeric film during deposition are preferably chosen to exhibit little, if any, capability of oxidizing the moderate work function metal. For example, poled polymeric films which rely near ambient temperatures to preserve alignment of on crosslinking at or organic molecular dipoles are contemplated to be located directly on a moderate work function reflective metal layer.

When a moderate work function reflective metal is employed in combination of poled polymeric film having a glass transition temperature of at least 50° C., it is preferred to interpose a thin (<0.1 μm) protective layer between the reflective metal layer and the polymeric film. With the protective layer present, modulation of the optical articles of the invention is still achieved as described above. When the protective layer is deposited prior to the polymeric film or its reactive precursors, the metal reflective layer is fully protected. Observable levels of protection are realized when the protective layer exhibits thicknesses as low as 10 Å; however, it is generally preferred for the protective layer to exhibit thicknesses in the range of from 100 to 700 Å. Any one or combination of the category (a) metal oxides and fluorides described above can be employed to form the protective layer. The protective layers are the specific subject matter of Rider et al., cited above.

EXAMPLES

The following examples illustrate preferred embodiments of the invention:

Prisms and other glass substrates employed as supports included a pitch polished deposition surface that was cleaned in successive stages using detergent, deionized water, iso-propyl alcohol, and a high purity toluene vapor reflux.

A mixture of MgF$_2$ (R.I. 1.387) and TEL-22 (R.I. 1.67) was co-evaporated onto a flint glass (R.I. 1.712) prism surface in a vacuum chamber in a weight ratio of 31:69 to a thickness of 715 nm. This yielded a first dielectric layer having a refractive index of 1.553. The pressure in the vacuum chamber during deposition was below 10$^{-5}$ Torr. The rate of deposition of TEL-22 was between 6 and 7 Å/sec, and the rate of deposition of MgF$_2$ was between 3 and 3.5 Å/sec.

To facilitate thickness and refractive index measurements a test deposition was made prior to the deposition reported above onto a control glass substrate having a refractive index (R.I. 1.457) lower than that of the first dielectric layer. Also, to assist in determining the exact ratio of TEL to MgF$_2$ coated onto the prism surface, separate control glass substrates were placed on either side of the prism during deposition.

After the thickness and refractive index of the first dielectric layer on the prism surface was determined, an optimum aim thickness for a reflective silver layer was calculated to be 237 Å. Silver deposition was then undertaken at 4 Å/sec., again placing two controls on opposite sides of the prism to assist is in accurate determination of layer thickness.

A protective layer was next formed on the reflective silver layer. A 50 Å layer of MgF$_2$ was evaporated at a pressure of less than $10^{-5}$ Torr. at a rate of 2 Å/sec.

To form the second dielectric layer a 15% by weight solution of a linear vinyl polymer (R.I. 1.563, T$_g$ 123° C.) containing organic molecular dipole repeating units comprised of an amino electron donor moiety and a methylsulfonyl electron acceptor moiety linked through a 4,4'-stilbene conjugated $\pi$ bonding system dissolved in doubly distilled trichloropropane was prepared. The solution was applied to the device through a 0.2 $\mu$m filter till the silver layer was entirely covered. The sample was then spun for 10 seconds at 500 rpm after which it was accelerated to 1000 rpm for a further 60 seconds.

The sample was immediately placed in a vacuum oven and baked to evaporate the solvent. The temperature was increased over a period of 2 hours to 95° C. at a reduced pressure of $1 \times 10^{-3}$ Torr. After 16 hours heating was discontinued and the sample was allowed to cool over a period of 3 hours before it was removed from the oven.

By comparing sample reflectance as a function of angle of incident electromagnetic radiation against a calculated model it was determined that the second dielectric layer exhibited a thickness of 1.98 $\mu$m and a refractive index of 1.566.

A gold electrode was next formed over the second dielectric layer, but limited in area so that it did not overlie a portion of the silver layer. Gold in the amount 395 Å was deposited at 5 Å/sec. to form an electrode on the surface of the device. To permit electrical contact to the silver layer for poling, a small area of the second dielectric layer which did not receive gold was removed by swabbing with dichloromethane to expose the underlying silver layer. Phosphor bronze contacts were attached to the exposed reflective silver layer and to the gold electrode using a conductive silver paste.

The polymeric second dielectric layer was poled by heating the sample to 95° C. over hours and then applying to the silver and gold layers through the contacts 150 volts for 2.5 hours. With the voltage still applied, the device was allowed to cool to room temperature over a period of 2 hours. The applied voltage was then removed.

Figure 3:
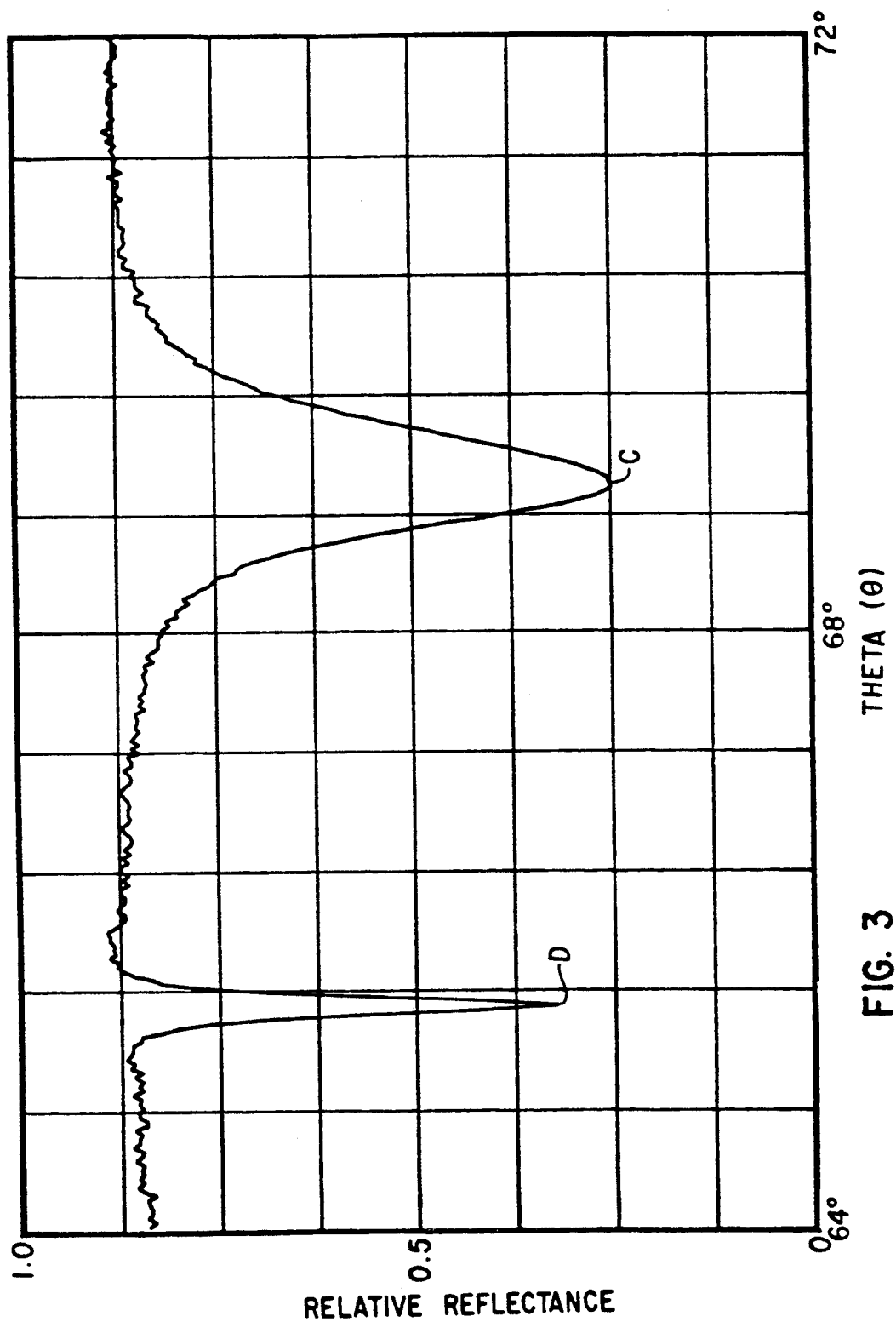
FIG. 3 is a plot of relative reflectance versus the angle of incidence ($\Theta$).

When the completed device was addressed with p-polarized light from a helium neon laser ($\lambda = 632$ nm), it was observed to modulate light in the long range surface plasmon mode and in a total of 7 guided modes. FIG. 3, which is a plot of reflectance the angle of incidence $\Theta$ over the range of from 64° to 72° shows a reduction of reflectance to 25 percent at C, which corresponds to the long range surface plasmon mode of operation. A a slightly higher minimum reflectance is shown at point D, corresponding to operation in the zero order guided mode. While minimum reflection was somewhat higher in the guided mode, the slope of reflectance curve adjacent the guided mode minimum was steeper than that of obtained in the long range surface plasmon mode of operation.

A sinusoidally oscillating voltage with an amplitude of Vo and a frequency of 1 KHz was applied across the second dielectric layer through the reflective silver layer and the gold electrode, causing a time varying change in the refractive index of the high $\chi^{(2)}$ polymeric layer. A small positive change in the refractive index of the polymeric layer causes the curve shown in FIG. 3 to shift in the direction of higher values of $\Theta$, changing the reflectance of the device at any selected value of $\Theta$. The modulation of the reflected laser beam, M, defined as the amplitude of the reflectance change divided by the average reflectance, was measured with the following results:

TABLE VII

| Operation Mode | Vo | M |
|---|---|---|
| Long Range Surface Plasmon | 141 | 0.021 |
| Zero Order Guided Mode | 117 | 0.23 |

The invention has been described in detail with particular reference to preferred embodiments thereof, but it will be understood that variations and modifications can be effected within the spirit and scope of the invention.

What is claimed is:

1. An optical article capable of modulating the reflection of polarized monochromatic electromagnetic radiation comprised of
   a reflective metal layer,
   means acting as a support for directing polarized electromagnetic radiation to said reflective metal layer,
   an electrooptic medium that exhibits a refractive index which is a function of an applied electrical potential, and
   a counter electrode,
   at least one of the reflective metal layer and the counter electrode taking the form of laterally spaced segments,
   characterized in that
   the reflective metal layer has a thickness of less than 0.5 $\mu$m,
   a dielectric layer is interposed between said reflective metal layer and said support having a refractive index less than that of said support and a thickness in the range of from 0.1 to 10 times the wavelength of the electromagnetic radiation, said dielectric layer being comprised of at least one metal oxide, metal fluoride, or low molecular weight aromatic compound.
   said electrooptic medium is a polymeric layer coated on said reflective metal layer exhibiting a second order polarization susceptibility greater than $10^{-9}$ electrostatic units and comprised of polar aligned molecular dipoles having an electron donor moiety linked through a conjugated $\pi$ bonding system to an electron acceptor moiety, and
   said polymeric layer exhibiting a refractive index which differs from that of said dielectric layer by less than 20 percent in the absence of an applied electrical potential.

2. An optical article according to claim 1 further characterized in that said segments form an array of parallel strips having their major axes oriented parallel to the direction of electromagnetic radiation propagation at the interface of the reflective metal layer with the electrooptic medium.

3. An optical article according to claim 2 further characterized in that said optical article additionally includes means for focusing reflected electromagnetic radiation.

4. An optical article according to claim 1 further characterized in that said optical article additionally includes means for individually controlling the electrical potential of each of said segments.

5. An optical article according to claim 1 further characterized in that said electrooptic medium is a poled polymeric layer having a glass transition temperature of at least 50° C.

6. An optical article according to claim 5 further characterized in that said electrooptic medium is a poled polymeric layer having a glass transition temperature of at least 80° C.

7. An optical article according to claim 1 further characterized in that said electrooptic medium is comprised of a polymer containing organic molecular dipoles within its repeating units.

8. An optical article according to claim 1 further characterized in that said dielectric layer is comprised of a metal oxide.

9. An optical article according to claim 8 further characterized in that said metal oxide is chosen from the group consisting of rare earth oxides, alkaline earth oxides, alumina, and silica.

10. An optical article according to claim 1 further characterized in that said first dielectric layer is comprised of a metal fluoride.

11. An optical article according to claim 10 further characterized in that said metal fluoride is chosen from the group consisting of alkali metal fluorides, alkaline earth fluorides, and rare earth fluorides.

12. An optical article according to claim 11 further characterized in that said metal fluoride is an alkali metal fluoride.

13. An optical article according to claim 12 further characterized in that said alkali metal fluoride is lithium fluoride.

14. An optical article according to claim 11 further characterized in that said metal fluoride is an alkaline earth fluoride.

15. An optical article according to claim 14 further characterized in that said alkaline earth fluoride is magnesium fluoride.

16. An optical article according to claim 1 further characterized in that said first dielectric layer is comprised of a low molecular weight aromatic compound.

17. An optical device according to claim 16, further characterized in that said aromatic compound is a phenylindan compound of the structure:

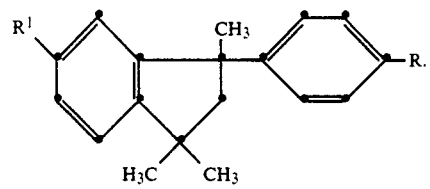

wherein R and R$^1$ are independently selected from the group consisting of nitro, amino, carboxyl, formamido groups, carbamoyl groups and heterocyclic groups derived from amino or carboxyl groups.

18. An optical device according to claim 16, further characterized in that said aromatic compound is a phthalimide compound of the structure:

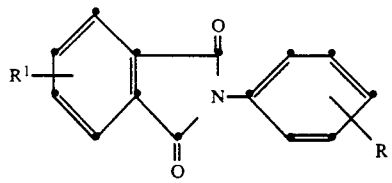

wherein R and R$^1$ are independently selected from the group consisting of nitro, amino, carboxyl, formamido groups, carbamoyl groups and heterocyclic groups derived from amino or carboxyl groups.

19. An optical article according to claim 1 further characterized in that said reflective metal layer is a noble metal layer.

20. An optical article according to claim 19 further characterized in that said noble metal layer is gold.

21. An optical article according to claim 1 further characterized in that said reflective metal layer has a work function in the range of from 3.5 to 4.5 eV.

22. An optical article according to claim 21 further characterized in that said metal is chosen from the group consisting of magnesium, indium, titanium, aluminum, nickel, cobalt, zinc, silver, tin, antimony, bismuth, and mixtures thereof.

* * * * *